US008602382B2

(12) United States Patent
Stein et al.

(10) Patent No.: US 8,602,382 B2
(45) Date of Patent: Dec. 10, 2013

(54) VALVE ASSEMBLIES

(75) Inventors: Uwe Bernard Pascal Stein, Edinburgh (GB); Gordon Paul Voller, Edinburgh (GB)

(73) Assignee: Artemis Intelligent Power Limited, Loanhead, Midlothian (GB)

( * ) Notice: Subject to any disclaimer, the term of this patent is extended or adjusted under 35 U.S.C. 154(b) by 167 days.

(21) Appl. No.: 13/062,828

(22) PCT Filed: Sep. 9, 2009

(86) PCT No.: PCT/GB2009/051155
§ 371 (c)(1),
(2), (4) Date: May 3, 2011

(87) PCT Pub. No.: WO2010/029359
PCT Pub. Date: Mar. 18, 2010

(65) Prior Publication Data
US 2011/0209784 A1  Sep. 1, 2011

(30) Foreign Application Priority Data

Sep. 9, 2008 (GB) .................................. 08164003.9
Sep. 9, 2008 (GB) .................................. 08164004.7

(51) Int. Cl.
*F16K 31/12* (2006.01)
*F16K 31/08* (2006.01)

(52) U.S. Cl.
USPC ....................... 251/30.04; 251/30.01; 251/65

(58) Field of Classification Search
USPC .......... 251/28, 30.01, 30.02, 30.03, 30.04, 65
See application file for complete search history.

(56) References Cited

U.S. PATENT DOCUMENTS

| | | | | |
|---|---|---|---|---|
| 2,413,622 A | * | 12/1946 | Harding, Jr. | .................... 251/70 |
| 2,856,569 A | | 10/1958 | Birge | |
| 3,762,442 A | | 10/1973 | Paul | |
| 3,762,683 A | | 10/1973 | Sangl | |
| 4,161,215 A | | 7/1979 | Bourne, Jr. et al. | |
| 4,921,208 A | | 5/1990 | LaMarca | |
| 5,735,582 A | * | 4/1998 | Eith et al. | .................. 303/119.2 |
| 5,918,852 A | * | 7/1999 | Otto | .......................... 251/30.04 |
| 6,125,803 A | | 10/2000 | Hattori et al. | |
| 6,827,331 B1 | | 12/2004 | Roos | |
| 7,053,742 B2 | | 5/2006 | Lanni et al. | |

(Continued)

FOREIGN PATENT DOCUMENTS

DE  2051 166 A1  8/1971
DE  102005014100  2/2006

(Continued)

OTHER PUBLICATIONS

International Search Report for PCT/GB2009/051155, mailed Nov. 12, 2009.

(Continued)

*Primary Examiner* — John K Fristoe, Jr.
*Assistant Examiner* — Daphne M Barry
(74) *Attorney, Agent, or Firm* — Lowe Hauptman & Ham, LLP

(57) ABSTRACT

An electronically actuatable valve assembly including a valve member comprising a ferromagnetic member, and a magnetic circuit adapted to direct magnetic flux through the ferromagnetic member when the valve member is spaced apart from its valve seat, to hold the primary valve open.

15 Claims, 3 Drawing Sheets

(56) References Cited

U.S. PATENT DOCUMENTS

| | | | |
|---|---|---|---|
| 2001/0032678 A1 | 10/2001 | Bircann et al. | |
| 2007/0040134 A1* | 2/2007 | Petersen | 251/30.01 |
| 2010/0084587 A1* | 4/2010 | Stein | 251/30.02 |
| 2011/0209783 A1* | 9/2011 | Stein et al. | 137/561 R |

FOREIGN PATENT DOCUMENTS

| | | |
|---|---|---|
| EP | 0 353 965 | 2/1990 |
| EP | 1 327 810 A2 | 7/2003 |
| EP | 1 363 057 A2 | 11/2003 |
| EP | 1 821 016 | 8/2007 |
| GB | 672696 A | 5/1952 |
| GB | 2 003 586 | 3/1979 |
| GB | 2 079 982 A | 1/1982 |
| GB | 2 276 222 A | 9/1994 |
| GB | 2 342 782 | 4/2000 |
| GB | 2 430 246 A | 3/2007 |
| JP | 62-141780 | 9/1987 |
| JP | 01-145484 | 6/1989 |
| JP | 5-503335 | 6/1993 |
| JP | 5-503335 A | 6/1993 |
| JP | 10-169824 | 6/1998 |
| JP | 10-169824 A | 6/1998 |
| JP | 2003-068524 A | 3/2003 |
| RU | SU333357 | 3/1969 |
| RU | 2227237 C2 | 4/2004 |
| RU | 2313716 | 12/2007 |
| RU | 2313716 C2 | 12/2007 |
| WO | 90/03519 A1 | 4/1990 |
| WO | 91/05163 A1 | 4/1991 |
| WO | 2004/104463 A1 | 12/2004 |
| WO | 2007/128977 A2 | 11/2007 |
| WO | 2008/029073 A1 | 3/2008 |

OTHER PUBLICATIONS

Examination Report for Egyptian patent application PCT376/2011.
International Search Report of Jun. 5, 2007 for PCT/GB2009/051154.
International Search Report of Jun. 5, 2007 for PCT/GB2006/003321.
Japanese Examination Report of Dec. 9, 2011 for JP2009-527185.
Japanese Examination Report of Apr. 2, 2013 for Japanese Patent Application No. JP2011-525633.
Examination Report—Decision on Grant for Russian patent application RU 2011113764.
Russian Notice of Acceptance—Decision on Grant for Russian patent application RU2009113032.
United States Office Action of Mar. 19, 2013 for U.S. Appl. No. 12/440,371.

* cited by examiner

VALVE ASSEMBLIES

This application is the U.S. national phase of International Application No. PCT/GB2009/051155 filed 9 Sep. 2009 which designated the U.S. and claims priority to European Application No(s) 08164003.9, filed 9 Sep. 2008 and 08164004.7, filed 9 Sep. 2008, the entire contents of each of which are hereby incorporated by reference.

FIELD OF THE INVENTION

The invention relates to the field of electronically actuated valve assemblies for regulating fluid communication between a manifold and a working chamber of a fluid working machine.

BACKGROUND TO THE INVENTION

Fluid working machines include fluid-driven and/or fluid-driving machines, such as pumps, motors, and machines which can function as either a pump or as a motor in different operating modes. Although the invention will be illustrated with reference to applications in which the fluid is a liquid, such as a generally incompressible hydraulic liquid, the fluid could alternatively be a gas.

When a fluid working machine operates as a pump, a low pressure manifold typically acts as a net source of fluid and a high pressure manifold typically acts as a net sink for fluid. When a fluid working machine operates as a motor, a high pressure manifold typically acts as a net source of fluid and a low pressure manifold typically acts as a net sink for fluid. Within this description and the appended claims, the terms "high pressure manifold" and "low pressure manifold" refer to manifolds with higher and lower pressures relative to each other. The pressure difference between the high and low pressure manifolds, and the absolute values of the pressure in the high and low pressure manifolds will depend on the application. For example, the pressure difference may be higher in the case of a pump which is optimised for a high power pumping application than in the case of a pump which is optimised to precisely determine the net displacement of fluid, for example, a pump for dispensing a metered amount of fluid (e.g. a liquid fuel), which may have only a minimal pressure difference between high and low pressure manifolds. A fluid working machine may have more than one low pressure manifold.

Fluid working machines are known which comprise a plurality of working chambers of cyclically varying volume, in which the displacement of fluid through the working chambers is regulated by electronically controllable valves, on a cycle by cycle basis and in phased relationship to cycles of working chamber volume, to determine the net throughput of fluid through the machine. For example, EP 0 361 927 disclosed a method of controlling the net throughput of fluid through a multi-chamber pump by opening and/or closing electronically controllable poppet valves, in phased relationship to cycles of working chamber volume, to regulate fluid communication between individual working chambers of the pump and a low pressure manifold. As a result, individual chambers are selectable by a controller, on a cycle by cycle basis, to either displace a predetermined fixed volume of fluid or to undergo an idle cycle with no net displacement of fluid, thereby enabling the net throughput of the pump to be matched dynamically to demand. EP 0 494 236 developed this principle and included electronically controllable poppet valves which regulate fluid communication between individual working chambers and a high pressure manifold, thereby facilitating the provision of a fluid working machine functioning as either a pump or a motor in alternative operating modes. EP 1 537 333 introduced the possibility of part cycles, allowing individual cycles of individual working chambers to displace any of a plurality of different volumes of fluid to better match demand.

Fluid working machines of this type require rapidly opening and closing electronically controllable valves capable of regulating the flow of fluid into and out of a working chamber from the low pressure manifold, and in some embodiments, the high pressure manifold. Some aspects of the invention aim to provide improved valve assemblies suitable for regulating the flow of fluid into and out of the working chamber of fluid working machines of this type. However, the valve assemblies of the present invention are applicable to other types of fluid working machine.

A technical problem which can arise with valve assemblies including electronically actuatable face seating valves (such as poppet valves), for regulating the supply of fluid into the working chamber of a fluid working machine, relates to the requirement to hold the face seating valve open whilst fluid is flowing through the valve. Bernoulli effects (kinetic energy related pressure drop) and surface friction arising from the flow of fluid past the face seating valve element (e.g. a poppet head) can exert a substantial force on the face seating valve element. Thus, it may be necessary to continue to supply a substantial amount of power to the electromagnet to keep the face seating valve open, or this effect may limit the maximum flow rate through the valve. Accordingly, the invention addresses the problem of holding open electronically actuatable face seating valves while fluid flows through the valves from a low or high pressure manifold to a working chamber of a fluid working machine, or in the reverse direction.

Some embodiments of the present invention also address the problem of opening a face seating valve, such as a poppet valve, against a pressure differential, to regulate the supply of fluid from a high-pressure manifold to a working chamber of a fluid working machine. This is technically difficult because, in a face seating valve, the fluid pressure acts over the seating area to create a large closing force. Accordingly, it is difficult to provide a face seating valve for regulating the supply of fluid from a high-pressure manifold to a working chamber of a fluid working machine which is capable of opening against a significant pressure differential and which also is also capable of opening quickly (ideally within a few milliseconds) whilst minimizing energy consumption.

GB 2,430,246 (Stein) discloses a valve assembly which is suitable for regulating the supply of fluid from a high-pressure manifold to a working chamber of a fluid working machine. The valve assembly comprises a primary valve, a secondary valve, an electromagnet and an armature (referred to as a moving pole). The primary valve comprising a face-seating primary valve member and a primary valve seat. The secondary valve is integral to the primary valve and includes a secondary valve member which is moveable between a sealing position and an open position in which a path is provided through the secondary valve for fluid to flow between opposite sides of the primary valve member to reduce the pressure difference across the primary valve member. Thus, the secondary valve, which has a much smaller surface area than the primary valve, can be opened even when there is a substantial pressure difference across the primary valve member. The working chamber is effectively a closed volume, and so fluid can flow through the secondary valve to equalise the pressure on either side of the primary valve member, thereby facilitating the opening of the primary valve.

In the valve assembly disclosed in GB 2,430,246, the face seating valve is held open by a spring. In practice it is extremely difficult for this spring to provide enough force to hold the valve open against the Bernoulli and surface friction forces. Thus, some embodiments of the present invention aim to provide a valve assembly which is not only capable of remaining open in the presence of significant Bernoulli and surface friction forces, but is also capable of opening quickly against a significant pressure differential, whilst minimizing energy consumption.

SUMMARY OF THE INVENTION

According to a first aspect of the present invention there is provided a valve assembly for regulating the supply of fluid from a fluid manifold to a working chamber of a fluid working machine, the valve comprising a primary valve, an electromagnet and an armature, the primary valve comprising a face-seating primary valve member and a primary valve seat and having an open position in which the primary valve member is spaced apart from the primary valve seat and a sealing position in which the primary valve member is in sealing contact with the primary valve seat, wherein the armature is slidable along a path extending between a first position and a second position, and wherein, when the armature is in the first position, the primary valve member is biased towards the sealing position, and wherein, when the armature is in the second position, the primary valve member is biased towards the open position, characterised in that the primary valve member comprises a ferromagnetic member and the valve further comprises a magnetic circuit adapted to direct magnetic flux through the ferromagnetic member when the primary valve is open to thereby hold the primary valve member in the open position.

Thus, when the primary valve is open and current is supplied to the electromagnet, the primary valve member is located at a minimum of magnetic potential energy, resisting Bernoulli and surface friction forces acting on the primary valve member due to the flow of fluid, past the primary valve member, through the valve seat. The valve assembly is therefore especially useful in fluid working machines where a relatively high rate of fluid flow is anticipated in use. The valve assembly may, for example, be used to regulate the supply of fluid from a high pressure fluid manifold to a working chamber of a fluid working motor (such as a fluid working machine which functions solely as a motor or as a pump or motor in alternative operating modes). Nevertheless, the valve assembly can also be useful for regulating the supply of fluid from a low pressure manifold to a working chamber of a fluid working motor.

The primary valve member may comprise both the ferromagnetic member and one or more non-ferromagnetic valve member portions. However, the primary valve member may consist entirely of the ferromagnetic member.

Because the primary valve member is biased towards the open position when the armature is in the second position, preferably by one or more elastic members, the primary valve member will be urged to a fully open condition in which it provides less resistance to flow through the valve than if it were biased to a closed position.

Preferably, the primary valve member is biased to the sealing position when the armature is in the first position and the primary valve member is biased to the closing position when the armature is in the second position by one or more elastic members. The armature is typically moveable relative to the primary valve member. Thus, by directing magnetic flux through the ferromagnetic member when the primary valve is open closure of the primary valve member due to forces acting on the primary valve member from fluid flow, without concomitant movement of the armature, can be avoided.

Preferably, the primary valve member comprises a sealing region which makes sealing contact with the primary valve seat and the magnetic circuit is configured to direct flux through the sealing region when the primary valve is open. Thus, the holding force is concentrated where it is most required.

The electromagnet is typically operable to attract the armature in use to thereby open the primary valve. Typically, the second position is closer to the electromagnet than the first position. The magnetic circuit preferably directs magnetic flux from the said electromagnet through the ferromagnetic member when the primary valve is in the open position to thereby hold the primary valve member while the electromagnet is engaged. Thus, when current is supplied to the electromagnet, it acts both to open the primary valve and to hold the primary valve member in the open position. Alternatively, a second electromagnet could be provided within the magnetic circuit to provide a magnetic field to hold the primary valve member.

Preferably, the magnetic circuit is adapted to direct magnetic flux through the ferromagnetic member both when the primary valve member is in the open position and when the primary valve member is in the sealing position, wherein the magnetic circuit is adapted to direct a higher density of magnetic flux through the ferromagnetic member when the primary valve member is in the open position. Thus, the magnetic circuit can function both to increase the attractive force between the electromagnet and the armature to open the primary valve, and to provide a well of magnetic potential energy to hold the primary valve member in the open position.

Preferably, the magnetic circuit comprises first and second magnetic circuit portions which are arranged to conduct magnetic flux in parallel, wherein the first magnetic circuit portion is configured to conduct magnetic flux through the armature, at least when the primary valve is in the sealing position and the armature is in the first position, and the second magnetic circuit portion is configured to conduct magnetic flux through the ferromagnetic member, at least when the primary valve is in the open position and the armature is in the second position. Preferably, the first magnetic circuit portion is configured to conduct magnetic flux through the armature both when the armature is in the first position and when the armature is in the second position. The second magnetic circuit portion may be configured to conduct magnetic flux through the ferromagnetic member both when the primary valve member is in the open position and when the primary valve member is in the sealing position.

The first magnetic circuit portion preferably comprises a flux bridge arranged to directed flux through the armature, at least when the armature is in the first position and typically also when the armature is in the second position. Typically, the armature is adapted to slide along an axis between the first and second positions. The flux bridge may, for example, comprise a plurality of radially inwardly extending magnetic circuit members arranged substantially normally to the said axis to direct magnetic flux through the armature. The armature may comprise a peripheral flange of magnetically permeable material, proximate to the flux bridge, through which a magnetic circuit can be formed when the armature is in the first position, the second position or between the first and second positions.

Typically, the magnetic circuit comprises a ferromagnetic body portion and the armature is spaced apart from the ferromagnetic body portion in the first position and contacts the ferromagnetic body portion in the second position.

Preferably, the second magnetic circuit portion is arranged so that when the primary valve member is in the open position, a continuous body of ferromagnetic material extends directly between the ferromagnetic member and the ferromagnetic body portion. It may be that, in the open position, the ferromagnetic member contacts the armature whilst the armature contacts the ferromagnetic body portion. It may be that, in the open position, the ferromagnetic member directly contacts the body portion. The ferromagnetic member may comprise a protruberance extending towards the body portion and contacting the body portion when the primary valve member is in the open position. The body portion may comprise a protruberance extending towards the ferromagnetic member and contacting the primary valve member when the primary valve member is in the open position.

Preferably, the magnetic circuit is formed and arranged so that the ratio of the reluctance of the first magnetic circuit portion to the reluctance of the second magnetic circuit portion is higher when the armature is in the second position and the primary valve member is in the open position than when the armature is in the first position and the primary valve member is in the sealing position. Preferably, the reluctance of the interface between the flux bridge and the armature (which may be a sliding contact or a small gap) is higher when the armature is in the second position. For example, the flux bridge and the armature may overlap with a greater overlap surface area when the armature is in the first position than when the armature is in the second position. This increases the proportion of the magnetic flux directed through the primary valve member when the primary valve member is open, holding the primary valve member open. In some embodiments, this arrangement facilitates the opening of or holding open of the primary valve member by providing an attractive force between the ferromagnetic member and the armature or body portion.

Preferably, the first magnetic circuit portion and armature are configured so that the reluctance of the first magnetic circuit portion is greater when the armature is in the second position than in the first position, to thereby increase the magnetic flux directed through the ferromagnetic member when the armature is in the second position and the primary valve member is in the open position.

The second magnetic circuit portion may be configured to conduct magnetic flux through the ferromagnetic member both when the primary valve member is in the open position and when the primary valve member is in the sealing position. The ferromagnetic member may contact the armature when the armature is in the first position and the primary valve member is in the sealing position. In this arrangement, flux will be directed preferentially through the flux bridge and armature rather than through the ferromagnetic member, facilitating movement of the armature from the first position without immediate movement of the primary valve member.

Typically, the primary valve member and armature are coaxial. Preferably, the valve assembly comprises an elastic member arranged to bias the primary valve member away from the primary valve seat and an elastic member arranged to bias the armature to contact the primary valve member such that the resultant forces bias the primary valve towards the sealing position.

The adjective "primary" in "primary valve", "primary valve member" and related terms, is used as a label for clarity and is not intended to imply that there is a secondary valve. Nevertheless, in some embodiments, the valve assembly may further comprise a secondary valve coupled to the armature, the secondary valve comprising a secondary valve member moveable between a sealing position and an open position, wherein when the armature is in the first position the secondary valve is biased to the sealing position and, when the armature is in the second position, the secondary valve is biased towards the open position.

In this case, the coupling between the armature and the secondary valve is preferably configured to enable the armature to move from the first position towards the second position without a corresponding movement of the secondary valve member, but to exert a force through the coupling between the armature and the secondary valve member to cause the secondary valve member to move and to thereby open the secondary valve, while the armature is at a location between the first position and the second position along the said path. The secondary valve member is arranged to provide a path for fluid to flow between opposite sides of the primary valve member in the open position so that, in use, when there is a pressure differential across the primary valve member which applies a force maintaining the primary valve member in sealing contact with the primary valve seat, opening of the secondary valve member enables pressure to be equilibrated on either side of the primary valve member to facilitate the opening of the primary valve member.

Thus, the valve assembly may be a valve assembly for regulating the supply of fluid from a high-pressure manifold to a working chamber of a fluid working machine, the valve assembly further comprising a secondary valve, the secondary valve comprising a secondary valve member moveable between a sealing position and an open position in which a path is provided through the secondary valve for fluid to flow between opposite sides of the primary valve member to reduce the pressure difference across the primary valve member, wherein the armature is coupled to the secondary valve member and the second position is closer to the electromagnet than the first position, wherein, in the first position, the secondary valve is biased towards the sealing position and, in the second position, the secondary valve is biased towards the open position, wherein the coupling between the armature and the secondary valve member is configured to enable the armature to move from the first position towards the second position without a corresponding movement of the secondary valve member, but to exert a force through the coupling between the armature and the secondary valve member to cause the secondary valve member to move and to thereby open the secondary valve, while the armature is at a location between the first position and the second position along the said path.

In contrast to the valve arrangement disclosed in GB 2,430, 246, the armature is part way along the path from the first position to the second position, and thereby closer to the electromagnet, when the force through the coupling between the armature and the secondary valve member causes the secondary valve member to move and to thereby open the secondary valve. As the armature travels towards the electromagnet, the attractive force acting on the armature due to the electromagnet should increase. Accordingly, the force which can be applied to the secondary valve member by the armature, through the coupling between the armature and the secondary valve member, is greater than would be the case in a valve such as that disclosed in GB 2,430,246 where the armature is at its furthest point from the electromagnet when the secondary valve member begins to move. This may enable the primary valve to open more quickly, more reliably, at higher pressure, or with less power consumption than if the armature was fixedly coupled to the secondary valve member. Thus a valve assembly is provided in which a relatively high opening force can be exerted on the secondary valve member and a relatively high force can be provided to hold the primary valve member in the open position.

Preferably, the secondary valve member is a face-seating valve and the secondary valve further comprises a secondary valve seat for sealable cooperation with the secondary valve member. The secondary valve is typically oriented in the same direction as the primary valve, so that, when the valve assembly is employed in a fluid-working machine such that there is fluid pressure differential which applies a force holding the primary valve member in sealing contact with the primary valve seat, a force in the same sense holds the secondary valve member in sealing contact with the secondary valve seat. The invention is of special benefit where the secondary valve is a face-seating valve as a substantial force can be required to open a face-seating secondary valve against a pressure differential. Preferably, the cross-section of the secondary valve seat is less than 10% of, and more preferably less than 5% of the cross-section of the primary valve seat, so that the force holding the secondary valve closed due to the pressure difference between the inlet and the outlet is substantially less than the corresponding force holding the primary valve closed.

Preferably, the secondary valve extends through the primary valve element to enable fluid to flow through the primary valve element when the secondary valve is in the open position to reduce the pressure differential between opposite sides of the primary valve member. Thus, the secondary valve seat may be integral to the primary valve element. The primary valve element and the secondary valve element may be coaxial and preferably move along coaxial paths in use.

Preferably, the coupling between the armature and the secondary valve member comprises an elastic member (the secondary elastic member) which is operable to store elastic energy as the armature travels along the path from the first position towards the second position. This provides a mechanism to enable the armature to move from the first position without the secondary valve member beginning to move, and enables the force acting on the secondary valve member to increase until it exceeds the force required to open the secondary valve member against a pressure differential in use.

Preferably, the force exerted on the secondary valve member through the coupling increases monotonically as the armature moves from the first position towards the second position, at least until the secondary valve member begins to move. The armature may move in a straight line extending from the first position towards the second position, directly towards the electromagnet.

The coupling between the armature and secondary valve member may comprise (or consist of) a distance limiting mechanism which is engageable to limit the maximum distance between the armature and the sealing part of the secondary valve member and to thereby couple movement of the armature to movement of the secondary valve along a portion of the path between the first position and the second position. In this case, the armature can begin to move from the first position towards the second position without movement of the secondary valve member, however, the armature will reach a position between the first position and the second position where the distance limiting mechanism engages and further motion of the armature must be coupled to concomitant movement of the secondary valve member. The coupling between the armature and the second valve member may comprise either or both of the said distance limiting mechanism and the said secondary elastic member.

Preferably, the valve assembly comprises a substantially rigid stem which extends through an aperture in the armature which is fixedly coupled to the secondary valve member on a first side of the armature located towards the working chamber in use and coupled to the armature by an elastic member on the opposite second side of the armature, such that the armature extends around and slides along the substantially rigid stem in use as the armature travels along the path from the first position. Preferably, the substantially rigid stem further comprises a formation on the second side of the armature which engages with the armature at the said location between the first position and the second position so that the armature drags open the secondary valve at the said location between the first position and the second position. In this case, the said formation and the surface of the armature which engages with the said formation can together form the distance limiting mechanism.

The armature and primary valve member may be coupled by a distance limiting mechanism which is engageable to limit the maximum distance between the armature and the primary valve member to thereby couple movement of the armature to movement of the primary valve member along a portion of the path between the first position and the second position. For example, the armature may comprise a primary valve member engaging formation to engage with and open the primary valve when the armature is between the first position and the second position.

The armature may be operable to engage first with the secondary valve and then with the primary valve member as the armature moves from the first position to the second position during opening of the valve to pull the secondary valve open before the primary valve member begins to move and then to unseat the primary valve member from the primary valve seat.

Typically, at least one elastic member, including the said secondary elastic member, together exert a biasing force on the armature to bias the armature towards the first position. Preferably also, the said biasing force increases as the armature moves from the first position towards the second position, wherein the increase in biasing force with distance is less than the increase in the force exertable by the electromagnet on the armature in use, due to the reduction in the distance between the electromagnet and the armature, at least where the armature is located between the first position and the position where the secondary valve member begins to move.

The valve assembly may comprise a primary elastic member which biases the primary valve member towards sealing contact with the primary valve seat. Preferably, the primary elastic member biases the armature towards the first position and the armature engages with the primary valve member when the armature is in the first position so that, in the first position, the primary elastic member biases the armature into contact with the primary valve member and thereby biases the primary valve member into sealing contact with the primary valve seat.

Valve assemblies in which an elastic member (e.g. the said primary elastic member) acts directly on the armature (e.g. referenced to the valve body and to the armature) to urge the armature to engage with the primary valve member and urge the primary valve member towards sealing contact with the primary valve seat are advantageous because they begin to close immediately that the armature is no longer held in the second position by the electromagnet. Thus, they can be closed rapidly. They can also be energy efficient as energy stored in the elastic member which acts directly on the armature during opening is used in closing.

Where, the valve assembly comprises a secondary elastic member which is referenced to the armature and the secondary valve member (for example, referenced to a substantially rigid stem which is integral with or attached to the secondary valve member and which extends through an aperture in the armature), and a primary elastic member referenced to the valve body and to the armature, the primary and secondary elastic members may be concentric springs, with the primary elastic member extending around the secondary elastic member. This arrangement facilitates the provision of a compact valve assembly and enables the axial extent of the valve to be minimised.

Preferably, the secondary valve is biased into the closed position, for example by an elastic member. Thus, where the secondary valve is a face seating valve, the secondary valve member may be biased into sealing contact with the secondary valve seat, for example by an elastic member.

An elastic member is preferably provided which biases the primary valve member away from the primary valve seat. The said elastic member may, for example, be referenced from the armature or the body of the valve assembly. Preferably, the said elastic member is arranged so that the force exerted by the said elastic member increases once the secondary valve is open. However, the said elastic member should exert a lower biasing force than the primary elastic member when the armature is in the first position so that the net biasing force on the primary valve member, when the armature is in the first position, biases the primary valve member into sealing contact with the primary valve seat.

A tertiary elastic member may be provided which has a first end which is fixed to the secondary valve member and a second end which is fixed to the primary valve member. Thus, the tertiary elastic member may function both to bias the secondary valve into a closed position and to bias the primary valve member away from the primary valve seat. The tertiary elastic member should exert a lower biasing force than the primary elastic member when the armature is in the first position so that the net biasing force on the primary valve member, when the armature is in the first position, and the secondary valve is closed biases the primary valve member into sealing contact with the primary valve seat. The tertiary elastic member is typically compressed, or further compressed, when the secondary valve first opens and therefore provides an additional force biasing the primary valve member away from the primary valve seat.

Preferably, an elastic member which is referenced to the secondary valve member, for example the said tertiary elastic member, may be located in a recess within the primary valve member, for example, within a bore which defines part of the said path through the secondary valve. Thus, the said elastic member may be shielded by the primary valve member from high fluid flow. The elastic member may be located entirely within a recess in the primary valve member when the armature is in contact with the primary valve member. Preferably, the said elastic member is operable to urge the primary valve member to unseat from the primary valve seat at least when the secondary valve is in the open position.

The armature may be coupled to the primary valve through the coupling between the armature and the secondary valve, for example, through the secondary elastic member and the tertiary elastic member.

It may be that the primary valve is biased open predominantly or solely by an elastic member referenced between the primary valve member and the secondary valve member. If, instead, the primary valve was biased open by an elastic member referenced between the valve body and the primary valve member, this would provide a force which would require to be overcome during closing, slowing closure of the valve and increasing the force required from any closing elastic member and thereby increasing the energy consumed to compress said closing elastic member on opening.

Preferably, the location of the armature where the coupling between the armature and the secondary valve member is operable to cause the secondary valve member to move is more than 50%, or more preferably more than 75%, of the distance from the first position to the second position.

Preferably, once the secondary valve member begins to move, it moves by a greater distance than the remaining travel of the armature along the path from the first position to the second position.

Typically, when the armature is in the second position, the secondary valve is or may be closed, particularly when the primary valve is open. The secondary valve should typically open to enable the primary valve to open although it may not be necessary for the secondary valve to remain open once the primary valve has opened.

Preferably, the interior of the valve assembly is configured to minimise restrictions on the movement of the armature from the first position due to a requirement to displace hydraulic fluid. Preferably, movement of the armature is not significantly restricted by the flow of hydraulic fluid through a throttle (e.g. an aperture sized to cause a significant pressure difference to develop across the aperture in use). This reduces forces restricting the armature from moving, slowing opening and/or closing of the valve.

The secondary valve member typically moves into a secondary valve member receiving volume when the secondary valve moves from the sealing position into the open position. The secondary valve member receiving volume is typically filled with hydraulic fluid in use which is displaced by the movement of the secondary valve member. In contrast to pressure balancing valves, the movement of the armature from the first position typically has no effect on or increases the pressure of hydraulic fluid in the secondary valve member receiving volume. This is advantageous because a reliance on movement of the armature to lower the pressure within the secondary valve member receiving volume can slow the opening of the valve and in particular slow its closing. Preferably the flow of hydraulic fluid into and out of the secondary valve member receiving volume is not throttled. Thus, the valve may close quickly without throttled flow slowing the flow of hydraulic fluid into the secondary valve member receiving volume.

The invention extends in a second aspect to a fluid working machine comprising a working chamber of cyclically varying volume, a high pressure manifold and a low pressure manifold, and a valve assembly according to the first aspect of the invention which regulates the supply of fluid from the high pressure manifold or the low pressure manifold to the working chamber.

When the secondary valve opens, fluid can flow from the respective manifold through the secondary valve to the working chamber. As a working chamber is a closed chamber (albeit one of cyclically varying volume) the pressure within the working chamber can equilibrate with pressure within the respective manifold, to reduce the pressure difference across the primary valve member and enable the primary valve to open. Preferably, the pressure difference across the primary valve member is reduced primarily by the pressure within the working chamber changing towards equilibrium with the pressure in the respective manifold as a result of fluid flowing through the secondary valve, after the secondary valve member is moved to the open position, before the primary valve member unseats from the primary valve seat. Preferably, the pressure difference across the primary valve member is not reduced primarily by providing a chamber within the valve assembly, in communication with the primary valve member, the pressure within which is reduced below the pressure in the respective manifold to enable the primary valve member to open.

The fluid working machine may further comprise a controller which is operable to actively control the said valve assembly, and optionally one or more other valves, in phased relation to cycles of working chamber volume, to determine the net displacement of the fluid by the or each working chamber on a cycle by cycle basis, to thereby determine the time averaged net displacement of fluid by the working machine or one or more groups of said working chambers.

Preferably, the pressure difference between the high pressure manifold and the low pressure manifold and the throughput of fluid through the valve assembly, are such that the fluid working machine would not function correctly if the primary valve member does not comprise a ferromagnetic member because, in at least some operating conditions, the primary valve would close too soon due to Bernoulli effects and/or surface friction due to fluid flowing past the primary valve head.

The fluid working motor may function only as a motor, or only as a pump. Alternatively, the fluid working motor may function as a motor or a pump in alternative operating modes.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
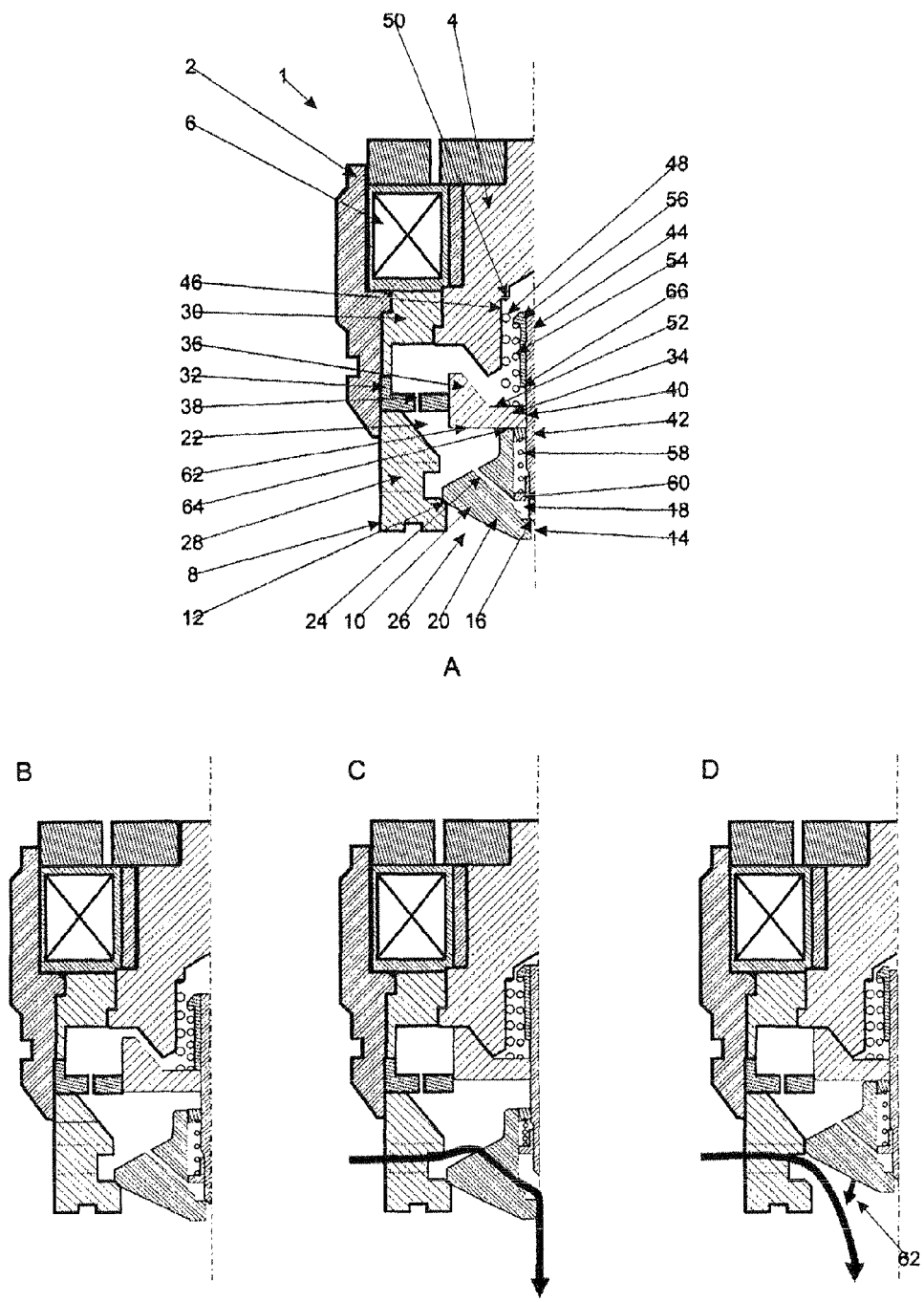
FIG. 1A is a part cross-section through a symmetric valve assembly while the valve is closed and before current is passed through the electromagnet.
FIG. 1B is a part cross-section through the valve assembly of FIG. 1A after the armature has moved from the first position, towards the second position responsive to the magnetic field generated by current being passed through the electromagnet.
FIG. 1C is a part cross-section through the valve assembly of FIG. 1A after the secondary valve member has moved from its valve seat to open the secondary valve.
FIG. 1D is a part cross-section through the valve assembly of FIG. 1A after the primary valve member has moved from the primary valve seat to open the primary valve and the armature has reached the second position.

With reference to FIGS. 1A through 1D, a valve assembly 1 according to the present invention has an annular valve housing 2, made from a magnetically permeable material, which encompasses a body portion 4, also made from a magnetically permeable material. A ring of high reluctance material 30 separates the valve housing from the body portion. An electromagnet 6 is formed around the body portion, within the valve housing. An annular poppet cage 8 extends from the valve housing and encompasses a primary poppet valve head 10, which functions as the primary valve member. The annular poppet cage is made from a magnetically permeable material and the primary poppet valve head is made from a ferromagnetic material, such as steel, and so functions as the ferromagnetic member. A valve seat 12 (functioning as the primary valve seat) is formed by a bevelled transition extending around the interior of the poppet cage. In a closed position, the primary poppet valve head mates with the primary valve seat to form a seal. The armature and primary poppet valve are configured so that the outward surface 62 of the armature can contact the inward surface 64 of the primary poppet valve head in order to apply force between the two parts, for example, when the valve is closed before a current is passed through the electromagnet.

The primary poppet valve head includes an aperture 14 located on the central axis of the primary poppet valve head. The aperture extends to a further bevelled transition 16, located within a valve head chamber 18, within the body of the primary poppet valve head, which also functions as a valve seat (the secondary valve seat), against which a secondary valve member 20 is biased, to form a seal, when the valve assembly is fully closed. The aperture communicates with an interior chamber 22, within the annular poppet cage, by way of the valve head chamber, and one or more of fluid passages 24. The fluid passages have sufficient cross-sectional area to avoid significantly restricting fluid flow. Thus, when the secondary valve member is not in sealing contact with the secondary valve seat, a path is provided for fluid to flow between the outlet 26 of the valve, and the interior chamber 22. However, this path is closed off when the secondary valve member is in sealing contact with the secondary valve seat.

The interior chamber is in fluid communication with one or more radial passages 28 which extend through the poppet cage, and function as inlets to the valve assembly. The radial passages extend into the interior chamber at a location which is intermediate the location of the periphery of the primary poppet valve head when the primary poppet valve is open, and the location of the periphery of the primary poppet valve head when the primary poppet valve head is in sealing contact with the primary poppet valve seat. Accordingly, a path is provided for fluid to flow directly from the inlets to the outlet, when the primary poppet valve is open, irrespective of whether the secondary valve is open. However, no path is provided for fluid to flow directly from the inlets to the outlet, around the periphery of the primary poppet valve head, when the primary poppet valve is closed.

A magnetic circuit is formed in part by a ring of high reluctance material 30, which is located around the periphery of the body portion. The magnetic circuit also includes a flux bridge 32, which extends radially inwards from the valve housing and contacts an armature 34, which is slidable from a first position, illustrated in FIG. 1A, to a second position, illustrated in FIG. 1B. The armature has a peripheral flange 36, which is thicker than the central portion of the armature, and which is in sliding contact with the flux bridge, and configured so as to remain in contact with (or, alternatively, remain very close to), the flux bridge whilst the armature is at any location between the first position and the second position. The flux bridge includes one or more through-bores 38, through which fluid can flow to enable the armature to move between the first and second positions. The annular valve housing, body portion and flux bridge together form a first magnetic circuit portion. A second magnetic circuit portion is formed by the annular valve housing, body portion and annular poppet cage, which is also made from a magnetically permeable material, such as steel, and in contact with the flux bridge.

The armature has a central aperture therethrough 40. A rigid stem 42 extends through the central aperture of the armature, and the chamber within the primary poppet valve head. The rigid stem has a first end which forms the secondary valve member 20, and an opposite second end 44, located within a recess 46, within the valve body portion.

The valve assembly comprises three springs. The main spring 48 (functioning as the primary elastic member) extends around the rigid stem from a transition 50 within the body portion recess to an inward surface 52 of the armature and is in compression throughout operation. A charge spring 54 (functioning as the secondary elastic member) extends from the inward surface of the armature, around the rigid stem, and is located on a peripheral flange 56 at the second end of the rigid stem. The peripheral flange also has an outward surface 66 against which the inward surface of the armature can react, so that the inward surface of the armature and the outward surface of the peripheral flange thereby form a distance limiting mechanism. A pilot spring 58 (functioning as the tertiary elastic member) extends between a radially outwardly extending peripheral flange 60 located towards the first end of the rigid stem, and a radially inwardly extending flange around the interior of the chamber within the primary poppet valve head. The pilot spring is relatively relaxed when the valve assembly is in the fully closed state illustrated in FIG. 1A but in compression when the secondary valve has opened but the primary valve has not opened, illustrated in FIG. 1C.

The primary valve member, the secondary valve member, the rigid stem, and each of the main, charge and pilot springs are coaxial. The main spring is concentric with and extends around the charge spring.

In an example application, the valve assembly is located within a fluid working machine, with the inlet connected to a high pressure manifold, and the outlet attached to a working chamber of cyclically varying volume. The electromagnet is connected to a current source which is switchable under the control of a controller to enable current to be supplied to the electromagnet when required.

When no current is supplied to the electromagnet, the valve adopts the closed position illustrated in FIG. 1A. The main spring provides a biasing force in an outwards direction and so the armature is biased in an outwards direction, pressing the primary poppet valve head into sealing contact with the primary valve seat through the contact across outward surface 62 and inward surface 64. The charge spring is relaxed and so exerts only a small force on the rigid stem in an inwards direction (i.e. towards the top of FIG. 1A). The pilot spring exerts an opposite and typically higher force on the rigid stem in an outwards direction. For example, the charge spring may have a preload of 10N and the pilot spring may have a preload of 15N. Thus, the net force on the rigid stem due to the preload within the charge spring and the pilot spring biases the rigid stem, and therefore the secondary valve member, outwards, into sealing contact with the secondary valve seat. The primary valve and secondary valve are also retained in the closed positions by the pressure differential between the internal chamber of the valve assembly, and the outlet. Accordingly, in the closed position illustrated in FIG. 1A, the valve assembly is closed and there is no path for fluid to flow from the high pressure valve, through the inlet, to the outlet and into the working chamber.

When current is supplied to the electromagnet, a magnetic circuit is formed, guiding flux through the armature. The electromagnet exerts an attractive force on the armature and the current through the electromagnet is selected so that the force acting on the armature is sufficient to move the armature from the first position to the second position. In a typical application, the attractive force would be insufficient to move the armature if the armature was fixedly coupled to the secondary valve member. However, according to the invention the elastic coupling allows the armature to move initially without movement of the secondary valve member. It is therefore possible to avoid unnecessary power expenditure by using a lower initial attractive force than was previously necessary. As the armature moves from the first position to the second position, the gap between the armature and the body portion decreases and the force on the armature increases.

Figure 2:
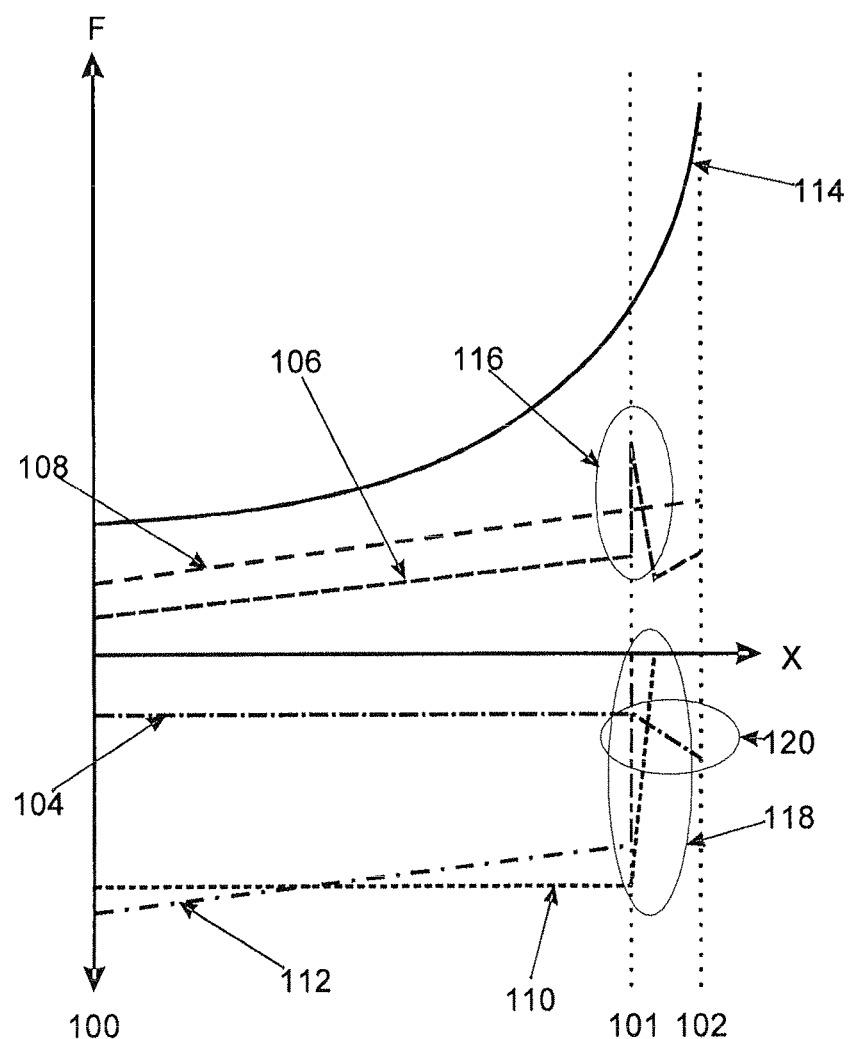
FIG. 2 is a graph of the variation with the location of the armature of forces acting on the rigid stem and secondary valve member within the valve assembly of FIG. 1A (forces acting in an inwards direction have positive values)

FIG. 2 is a graph of the variation in relevant forces whilst the armature travels along a path from a first position 100 to a second position 102 which is closer to the electromagnet than the first position. The path extends directly from the first position to the second position, straight towards the central axis of the toroidal electromagnet. The force from the pilot spring 104 (which acts in an inwards direction on the primary poppet valve head and an outwards (negative in the graph) direction on the rigid stem and integral secondary valve member) is constant as the armature begins to move, as the primary valve and secondary valve remain closed, held in place by the biasing forces and the pressure differential. The force from the charge spring 106 (which acts in an outwards direction on the armature and in an inwards direction (positive in the graph) on the rigid stem and therefore the secondary valve member) increases monotonically as the armature begins to move, without movement of the rigid stem, due to shortening of the charge spring. The force from the main spring 108 (which acts in an outwards direction on the armature), also increases monotonically as the armature moves from the first position to the second position. The pressure differential between the inlet and outlet of the valve assembly remains constant while the secondary valve remains closed and a constant force 110 in an outwards direction acts on the secondary valve member (and thereby the rigid stem, negative in the graph) as a result.

The total resultant force on the secondary valve is shown as line 112 and it can be seen that at the first position 100 this is initially significantly more than the total force 114 which can be exerted by the electromagnet in the opposite (inwards, opening) direction. However, the total force 114 is larger than the net force on the armature from the opening force 106 coming from the charge spring 54 and the pilot force 104 from the pilot spring 58, allowing the armature to move away from the first position 100. As the armature moves from the first position towards the open position the opening force on the armature exerted by the charge spring increases linearly but the total force which the electromagnet exerts on the armature increases with second order components and exceeds the resultant force required to open the secondary valve member when the armature reaches an opening position 101 between the first and second positions. The location of the opening position will vary depending on the pressure differential between the inlet and the outlet. The configuration of the valve assembly when the armature reaches the opening position is illustrated in FIG. 1B.

In the example of FIG. 2 the net force generated on the rigid stem from the combination of the charge and pilot springs is not large enough in itself to move the rigid stem against the fluid forces 110 which result from the pressure difference across the primary valve member. It is possible that at low pressure differentials the net force would be high enough and the rigid stem would move inwards, moving the secondary valve member out of sealing contact with the secondary valve seat, and opening the secondary valve, as illustrated in FIG. 1C. However, in applications with sufficiently high pressure differentials, the inward surface 52 of the armature contacts the outward surface 66 of the peripheral flange 26 at the opening point 101. Thus, the maximum distance between the armature and the secondary valve member is limited and there is a sudden increase 116 in the opening force 106 which is applied to the rigid stem by the armature. The forces acting on the rigid stem are now sufficient to move the rigid stem inwards, moving the secondary valve member out of sealing contact with the secondary valve seat, and opening the secondary valve, as illustrated in FIG. 1C. It can be seen that the force applied by the charge spring in combination with the contacting inward and outward surfaces of the armature and the peripheral flange respectively is much higher than the armature would be able to supply in the open position 100. However, because the armature has moved almost to the closed position in the example illustrated in FIG. 2, a much higher opening force is available than would otherwise be the case.

Once the secondary valve opens, it provides a path of relatively small cross-section for fluid to flow from the internal chamber of the valve assembly, through the secondary valve seat and the central aperture in the primary poppet valve head, to the outlet. The outlet is connected to a working chamber which is effectively a closed volume, as the opening process happens so quickly that any change in working chamber volume is negligible. Accordingly, as high-pressure fluid is supplied to the working chamber through the secondary valve, the pressure at the inlet and the outlet begins to equilibrate due to an increase in pressure at the outlet. The total force required to move the rigid stem begins to drop 118, as the pressure differential drops. The force within the charge spring begins to drop 116, as the rigid stem begins to move relative to the primary poppet valve head, and the force within the pilot spring begins to increase 120, as the rigid stem moves relative to the primary poppet valve head, thereby reducing the length of the pilot spring. The rigid stem will settle in a position where the force from the pilot spring and the force from the charge spring are equal.

Once the secondary valve is open, the pressure differential across the primary poppet valve member drops rapidly, and the primary valve member can be readily unseated from the primary valve seat and displaced to the position illustrated in FIG. 1D by virtue of the forces transmitted through the rigid stem and pilot spring. Fluid can therefore flow freely from the inlet to the outlet. The secondary valve will typically remain open when the valve assembly is in the open position, however, this is not essential. The primary valve will be biased open as the net force exerted by the pilot spring now exceeds the net force exerted by the charge spring, so long as the armature is held in the second position, thereby removing the force of the main spring that would otherwise act to close the primary valve. The primary valve will close again, due to the action of the main spring, and the secondary valve will close again, due to the higher preload force of the pilot spring over the charge spring, when the current flowing through the electromagnet is cut off. As the main spring acts directly on the armature which bears directly against the primary valve member, the primary poppet valve head starts to move towards the primary valve seat rapidly once the current flowing through the electromagnetic is cut off. Because it is referenced to the concomitantly-moving secondary valve, the pilot spring which opens the primary valve does not appreciably compress during closure, ensuring that the full force of the main spring is available to accelerate the closing.

In the illustrated valve arrangement, a magnetic circuit is formed comprising a first magnetic circuit portion, which extends through the flux bridge and the armature, and a second magnetic circuit portion which extends through the poppet cage and the primary poppet valve head. The first and second magnetic circuit portions are in parallel.

When the valve assembly is in the position illustrated in FIG. 1A and current is first supplied to the electromagnet, magnetic flux is conducted predominantly through the annular valve housing, flux bridge and armature, and across the gap between the armature and body portion. The flux density through the poppet cage and primary poppet valve head is relatively low as the reluctance of the first magnetic circuit portion is substantially lower than the reluctance of the second magnetic circuit portion.

The armature is attracted to the body portion and begins to move towards the body portion. The peripheral flange around the armature is arranged so that the flux bridge nearly contacts the armature across the entire cross-sectional area of the flux bridge not only when the armature is in the first position but through the first part of the movement of the armature. The armature moves away from the primary poppet valve head which cannot initially move and the reluctance of the second magnetic circuit portion increases still further.

Once the armature reaches the second position, after the secondary valve has started to open, the armature contacts the body portion and remains held in place against the body portion while a current continues to flow through the electromagnet. However, the peripheral flange is arranged so that, in the second position, the overlap between the peripheral flange and the flux bridge is significantly less than the entire cross-sectional area of the flux bridge. This increases the reluctance of the junction between the flux bridge and the armature.

After a short period of time, the secondary valve member contacts the armature which itself remains in contact with the body portion. While current continues to be supplied through the electromagnet, a magnetic circuit is completed through the electromagnet, the poppet cage, the primary poppet valve head and the armature. Thus, in the open position, the primary poppet valve head is magnetically attracted to the armature, and is subject to a force, which resists Bernoulli forces which act on the primary poppet valve head, caused by the rapid flow of fluid, from the inlet, past the periphery of the primary poppet valve head to the outlet and then to a working chamber, down a pressure gradient. Thus, the primary poppet valve head is held open by virtue of the magnetic circuit.

This mechanism is facilitated by the increased reluctance of the junction between the flux bridge and the armature, which directs flux through the poppet valve cage and the primary poppet valve head (functioning as the second magnetic circuit portion). Even though the overall reluctance of the path through the flux bridge and armature to the body portion may be lower when the armature is in the second position than the first position because the armature is in direct contact with the body portion, the ratio of the reluctance of the path through the flux bridge and armature to the body portion to the reluctance of the path through the primary valve poppet head is higher when the armature is in the second position and the primary valve poppet head is held open. Thus, a higher proportion of magnetic flux are directed through the primary valve poppet head than would otherwise be the case, increasing the available holding force.

Once the current to the electromagnet is switched off, the magnetic field decays and the primary poppet valve head moves in an outwards direction to sealingly contact the primary valve seat.

In alternative embodiments, the primary valve poppet head may directly contact the body portion in the open position. The primary valve poppet head or the body portion may comprise a protuberance to facilitate this direct contact.

In alternative embodiments, corresponding magnetic circuitry could be employed to hold open the valve member of valve assemblies which do not include secondary valves.

Although the primary valve poppet head is made entirely from ferromagnetic material in this example embodiment, one skilled in the art will appreciate that the primary valve member may comprise both a ferromagnetic region and a non-ferromagnetic region.

The valve arrangement disclosed herein has significant advantages over the valve arrangement of GB 2,430,246. The armature is able to move close to the electromagnet before the secondary valve opens so as to be able to provide the maximum opening force on the secondary valve, but the secondary valve is able to have the same travel as before as once it starts moving, and is therefore subject to a reduced force from fluid pressure as the pressure in the working chamber equalises, it is fully opened by the action of the compressed secondary spring. Also, the electromagnet is able to apply attractive magnetic force to the primary valve to hold it open, directly applying it rather than only through the action of a spring which is extended and therefore only able to provide a weak holding force. These advantages means that a valve can be provided which consumes less power and which can open against greater pressure differentials.

Figure 3:
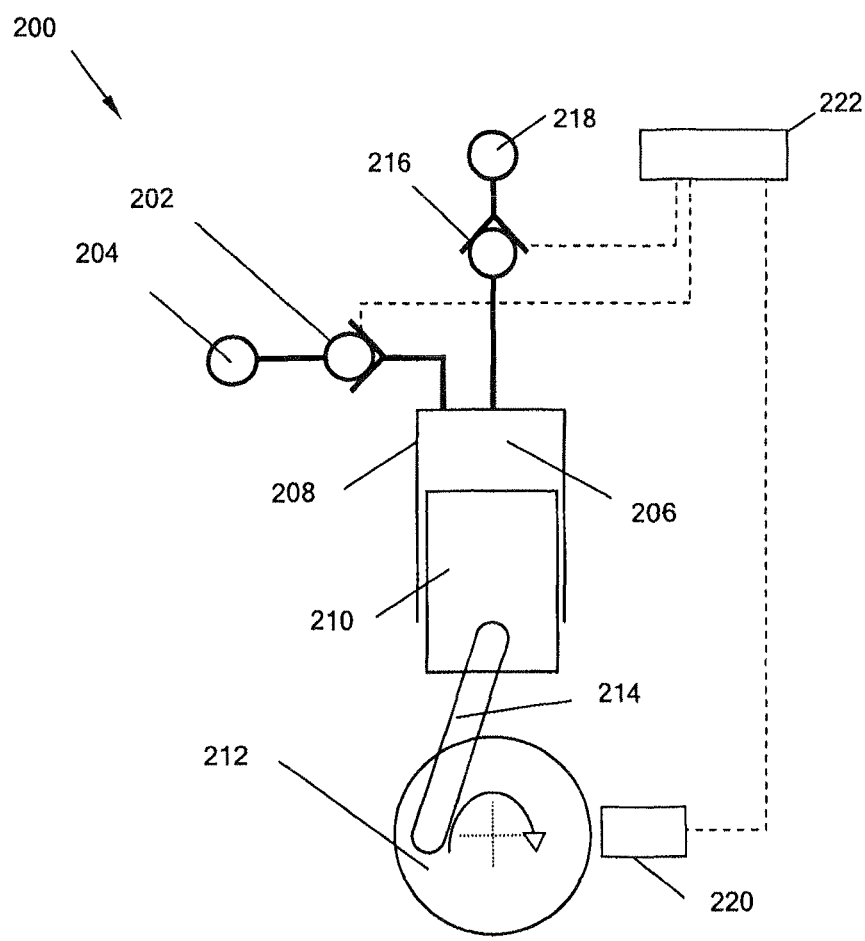
FIG. 3 is a schematic diagram of a fluid working machine incorporating the valve assembly of FIG. 1A.

FIG. 3 is a schematic diagram of a fluid working machine, shown generally as 200, incorporating the illustrated valve assembly 202 as a high pressure valve, which regulates the flow of hydraulic fluid between a high pressure manifold 204 and a working chamber 206. The working chamber is defined by the interior of a cylinder 208 and a piston 210 which is mechanically linked to the rotation of a crankshaft 212 by a suitable mechanical linkage 214, and which reciprocates within the cylinder to cyclically vary the volume of the working chamber. A low pressure valve 216 regulates the flow of hydraulic fluid between a low pressure manifold 218 and the working chamber. The example fluid working machine includes a plurality of working chambers and mechanically linked to the rotation of the same crankshaft, with appropriate phase differences. A shaft position and speed sensor 220 determines the instantaneous angular position and speed of rotation of the shaft, and transmits shaft position and speed signals to a controller 222, which enables a controller to determine instantaneous phase of the cycles of each individual working chamber. The controller is typically a microprocessor or microcontroller which executes a stored program in use. The low pressure valve is electronically actuatable, and the opening and/or the closing of the high and low pressure valves is under the active control of the controller.

The example fluid working machine is operable to function as either a pump or a motor in alternative operating modes. When operating as a pump, low pressure fluid is received from the low pressure manifold, and output through the high pressure valve to the high pressure manifold. Shaft power is therefore converted into fluid power. When operating as a pump, high pressure fluid is received from the high pressure manifold, and output through the low pressure valve to the low pressure manifold. Fluid power is therefore converted into shaft power.

The controller regulates the opening and/or closing of the low and high pressure valves to determine the displacement of fluid through each working chamber, on a cycle by cycle basis, in phased relationship to cycles of a working chamber volume, to determine the net throughput of fluid through the machine. Thus, the fluid working machine operates according to the principles disclosed in EP 0 361 927, EP 0 494 236, and EP 1 537 333, the contents of which are incorporated herein by virtue of this reference.

The valve assembly of the present invention is of particular benefit in connection with fluid working machines of this type, as it can be opened quickly (within a few milliseconds) against a pressure differential, without excessive energy expenditure. Furthermore, as the valve assembly can be held open by the magnetic circuit arrangement, a substantial volume of fluid can flow through the valve assembly over a short period of time without the valve assembly being dragged shut. The valve assembly may be useful as either a low or high pressure valve.

Further modifications and variations may be made within the scope of the invention herein disclosed.

The invention claimed is:

1. A valve assembly regulating a supply of fluid from a fluid manifold to a working chamber of a fluid working machine, the valve comprising; a primary valve, an electromagnet and an armature, the primary valve comprising a face-seating primary valve member and a primary valve seat and having an open position in which the primary valve member is spaced apart from the primary valve seat and a sealing position in which the primary valve member is in sealing contact with the primary valve seat, wherein the armature is slidable along a path extending between a first position and a second position, and wherein, when the armature is in the first position, the primary valve member is biased towards the sealing position, wherein, when the armature is in the second position, the primary valve member is biased towards the open position wherein the primary valve member comprises a ferromagnetic member and the valve assembly further comprises a magnetic circuit adapted to direct magnetic flux through the ferromagnetic member when the primary valve is open to thereby hold the primary valve member in the open position.

2. A valve assembly according to claim 1, wherein the magnetic circuit is adapted to direct magnetic flux through the ferromagnetic member both when the primary valve member is in the open position and when the primary valve member is in the sealing position, wherein the magnetic circuit is adapted to direct a higher density of magnetic flux through the ferromagnetic member when the primary valve member is in the open position.

3. A valve assembly according to claim 1, wherein the magnetic circuit comprises first and second magnetic circuit portions which are arranged to conduct magnetic flux from the electromagnet in parallel, wherein the
   first magnetic circuit portion is configured to conduct magnetic flux through the armature, at least when the primary valve member is in the sealing position and the armature is in the first position, and the second magnetic circuit portion is configured to conduct magnetic flux through the ferromagnetic member, at least when the primary valve member is in the open position and the armature is in the second position.

4. A valve assembly according to claim 3, wherein the first magnetic circuit portion and armature are so that a ratio of the reluctance of the first magnetic circuit portion to the reluctance of the second magnetic circuit portion is higher when the armature is in the second position and the primary valve member is in the open position than when the armature is in the first position and the primary valve member is in the sealing position, to thereby increase the magnetic flux directed through the primary valve member when the armature is in the second position and the primary valve member is in the open position.

5. A valve assembly according to claim 4, wherein the first magnetic circuit comprises a flux bridge arranged to direct flux through the armature when the armature is in the first position, wherein the reluctance of the interface between the flux bridge and the armature is higher when the armature is in the second position than when the armature is in the first position.

6. A valve assembly according to claim 5, wherein the armature overlaps with the flux bridge to define a surface area, wherein the surfice area is less when the armature is in the second position than the first position to thereby increase the reluctance of the interface between the flux bridge and the armature when the armature is in the second position.

7. A valve assembly according to claim 5, wherein the armature is adapted to slide along an axis from the first position to the second position and the flux bridge comprises a plurality of radially inwardly extending magnetic circuit members.

8. A valve assembly according to claim 1, wherein the second magnetic circuit portion is configured to conduct magnetic flux through the ferromagnetic member both when the primary valve member is in the open position and when the primary valve member is in the sealing position.

9. A valve assembly according to claim 1, further comprising an elastic member arranged to bias the primary valve member away from the primary valve seat and an elastic member arranged to bias the armature to contact the primary valve member such that the resultant forces bias the primary valve towards the sealing position.

10. A valve assembly according to claim 1, further comprising a secondary valve coupled to the armature and comprising a secondary valve member moveable between a sealing position and an open position, wherein when the armature is in the first position the secondary valve is in the sealing position.

11. A valve assembly according to claim 10, wherein the coupling between the armature and the secondary valve is configured to enable the armature to move from the first position towards the second position without a corresponding movement of the secondary valve member, but to exert a force through the coupling between the armature and the secondary valve member to cause the secondary valve member to move and to thereby open the secondary valve, while the armature is at a location between the first position and the second position along said path.

12. A valve assembly according to claim 10, wherein the secondary valve member is arranged to provide a path for fluid to flow between opposite sides of the primary valve member in the open position so that, in use, when there is a pressure differential across the primary valve member which applies a force maintaining the primary valve member in sealing contact with the primary valve seat, opening of the secondary valve member enables pressure to be equilibrated on either side of the primary valve member to facilitate the opening of the primary valve member.

13. A valve assembly according to claim 1, wherein the valve assembly is a valve assembly for regulating the supply of fluid from a high pressure manifold to a working chamber of a fluid working machine, the valve assembly further comprising a secondary valve, the secondary valve comprising a secondary valve member moveable between a sealing position and an open position in which the secondary valve provides a path for fluid to flow between opposite sides of the primary valve member to reduce the pressure difference across the primary valve member, wherein the armature is coupled to the secondary valve member and the second position is closer to the electromagnet than the first position, wherein, in the first position, the secondary valve member is biased towards the sealing position and in the second position, the secondary valve member is biased towards the open position, wherein the coupling between the armature and the secondary valve member is configured to enable the armature to move from the first position towards the second position without a corresponding movement of the secondary valve member, but to exert a force through the coupling between the armature and the secondary valve member to cause the secondary valve member to move and to thereby open the secondary valve, while the armature is at a location between the first position and the second position along said path.

14. A fluid working machine comprising a working chamber of cyclically varying volume, a high pressure manifold and a low pressure manifold, and a valve assembly according to claim 1, for regulating the supply of fluid from the high pressure manifold or the low pressure manifold to the working chamber.

15. A fluid working machine according to claim 14 further comprising a controller which is operable to actively control said valve assembly, and optionally one or more other valves, in phased relation to cycles of working chamber volume, to determine a net displacement of the fluid by the working chamber on a cycle by cycle basis.

* * * * *